No. 681,425. Patented Aug. 27, 1901.
J. TYRE.
COMBINED ERASER AND DRIER.
(Application filed May 17, 1900.)
(No Model.)

Witnesses
J. S. Williamson
L. H. Morrison

Inventor
Joseph Tyre

UNITED STATES PATENT OFFICE.

JAMES TYRE, OF WILMINGTON, DELAWARE.

COMBINED ERASER AND DRIER.

SPECIFICATION forming part of Letters Patent No. 681,425, dated August 27, 1901.

Application filed May 17, 1900. Serial No. 17,018. (No model.)

*To all whom it may concern:*

Be it known that I, JAMES TYRE, a citizen of the United States, residing at Wilmington, county of Newcastle, and State of Delaware, have invented a certain new and useful Improvement in a Combined Eraser and Drier, of which the following is a specification.

My invention relates to a new and useful improvement in combination erasers and driers for slates, blackboards, and the like, and has for one object to provide an exceedingly simple and effective device of this description which is adapted to hold a supply of water which is fed to a sponge, thereby moistening the same; and a further object of my invention is to provide ready means for filling the water-reservoir and to so construct the latter as to insure the flow of water therefrom to the sponge and yet prevent its outflow when the device is not in use.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
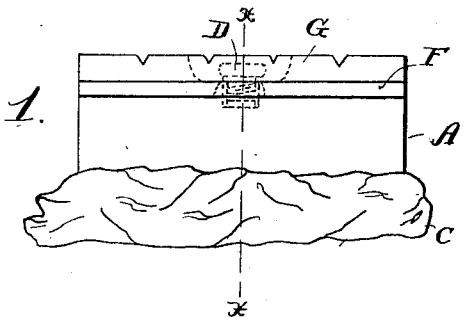
Figure 2:
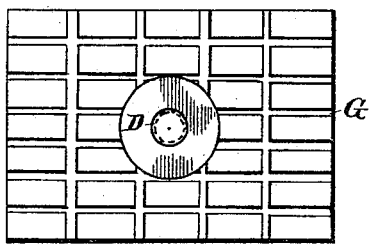
Figure 3:
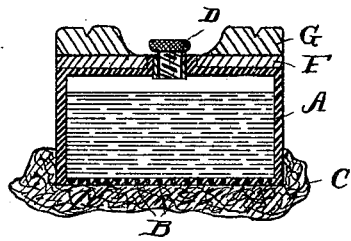

Figure 1 is a side elevation of my improved combination eraser and drier; Fig. 2, a plan view thereof, and Fig. 3 a cross-section on the line $x\ x$ of Fig. 2.

In carrying out my invention as here embodied, A represents the reservoir, which is preferably composed of a casing of rubber, and the bottom of this reservoir is perforated, as shown at B, and has a sponge C secured thereon, so as to cover the punctures for the purpose hereinafter set forth.

D represents a screw-cap which is threaded into a collar E, secured in the top of the reservoir, and serves to permit the convenient filling of the reservoir and to prevent the outflow of water at this point. A wooden block F is secured to the top of the reservoir by cement or otherwise and has in turn secured thereto the drying-pad G, which latter may be made of felt or other suitable material and is preferably checkered, as shown, for the purpose of producing edges which will more readily remove the accumulation on the slate. From this description it will be seen that water may be readily placed within the reservoir, and thereafter the device may be used to erase from a slate or blackboard, and when so in use the sponge will be kept moistened by the limited outflow of water through the perforations. The outflow of water is retarded owing to the fact that the reservoir is air-tight. A vacuum is formed when the water is forced out. This outflow of water may be accelerated by pressure upon the casing, and in practice the block F is grasped between the fingers and thumb, and when more moisture is needed in the sponge a slight downward pressure upon the block will bring about the desired result. For drying a slate after the writing thereon has been erased the device is reversed and the felt pad G applied to the surface of the slate in the usual manner.

It will be noted that as a certain amount of pressure is necessary to force the water from the reservoir to the sponge the water will not flow from the reservoir when the device is not in use and only then when a certain amount of pressure is exerted upon the block. This is an important feature of my improvement, since it adapts the device for use by school children and permits its storage with other articles without liability of injuring the same by the outflow of the water.

The cost of manufacture of my combined eraser and drier is comparatively small, while it is well adapted for the purpose intended, and its use requires no skill.

Of course I do not wish to be limited to the exact construction here shown, as this may be varied in certain limits without departing from the spirit of my invention.

Having thus fully described my invention, what I claim as new and useful is—

1. A combined eraser and drier consisting of a compressible rubber casing having perforations formed in its bottom, a sponge secured around the bottom of the casing covering its perforations, a block and normally air-tight filling-tube for the casing substantially as described.

2. A combined eraser and drier consisting of a compressible rubber casing having perforations formed in the bottom thereof, a sponge secured around the bottom of the casing covering the perforations, a wooden block secured to the top of the casing so as to render it rigid, and a threaded cap adapted to screw into the top of the casing, as specified.

In testimony whereof I have hereunto affixed my signature in the presence of two subscribing witnesses.

JAMES TYRE.

Witnesses:
CHARLES GREEN,
JOSEPH YARNALL.